Patented Sept. 7, 1943

2,328,962

UNITED STATES PATENT OFFICE 2,328,962

REACTION PRODUCT OF ALDEHYDES AND BIS-DIAZINYL CARBAZIDES

Gaetano F. D'Alelio and James W. Underwood, Pittsfield, Mass., assignors to General Electric Company, a corporation of New York No Drawing. Application September 10, 1942, Serial No. 457,872

20 Claims. (Cl. 260—42)

This invention relates to the production of new synthetic materials and especially to new reaction products having particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, aldol, glycollic aldehyde, etc., and a carbazide or a thiocarbazide corresponding to the following general formula:

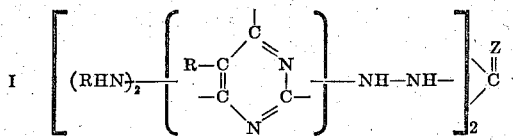

In the above formula, R represents a member of the class consisting of hydrogen and monovalent hydrocarbon and substituted hydrocarbon radicals, more particularly halohydrocarbon radicals, and Z represents a member of the class consisting of oxygen and sulfur. Instead of the 1,3-diazine or pyrimidine derivatives represented by the above formula, corresponding derivatives of the 1,2- or ortho-diazines (pyridazines) or of the 1,4- or para-diazines (pyrazines) may be employed.

This application is a continuation-in-part of our copending application Serial No. 455,214, filed August 18, 1942, and assigned to the same assignee as the present invention.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, dephenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc.

Preferably R in Formula I is hydrogen. Such compounds correspond to the general formula:

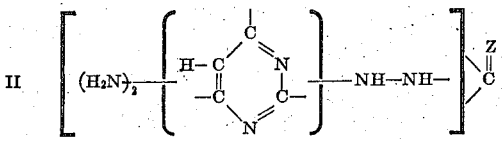

where Z represents a member of the class consisting of oxygen and sulfur.

The carbazides and thiocarbazides that are used in carrying the present invention into effect are more fully described and are specifically claimed in our parent copending application Serial No. 455,214. As pointed out in this copending application, the carbazides and thiocarbazides employed in practicing the instant invention may be prepared by effecting reaction, in the presence of a hydrohalide acceptor, preferably a tertiary base such, for example, as a trialkyl or triaryl amine, between (1) a carbonyl or thiocarbonyl chloride or bromide and (2) a hydrazino diamino [(—NHR)$_2$] diazine, more particularly a hydrazino diamino pyrimidine, in the ratio of one mol of the former to at least two mols of the latter. Another method comprises effecting reaction, under heat, between (1) a hydrazino diamino [(—NHR)$_2$] diazine, more particularly a hydrazino diamino pyrimidine, and (2) urea or thiourea, the reaction preferably being carried out in aqueous solution. At least two mols of the hydrazino diamino diazine are used per mol of urea or thiourea. In this last-named method of preparation it is necessary, in all cases, to effect reaction under conditions such as will result in the formation of ammonia as a by-product of the reaction.

Examples of compounds embraced by Formula I that may be used in producing our new condensation products are listed below:

Bis-[2,6-di-(methylamino) pyrimidyl-4] carbazide, which also may be named bis-[2,4-di-(methylamino) pyrimidyl-6] carbazide Bis-[4,6-di-(methylamino) pyrimidyl-2] carbazide Bis-[2,6-di-methylamino) pyrimidyl-4] thiocarbazide Bis-(2,6-diamino pyrimidyl-4) carbazide Bis-(4,6-diamino pyrimidyl-2) thiocarbazide Bis-(4,6-diamino pyrimidyl-2) carbazide Bis-(2,6-diamino pyrimidyl-4) thiacarbazide Bis-(4,6-diamino 5-methyl pyrimidyl-2) carbazide Bis-(2,6-diamino 5-ethyl pyrimidyl-4) carbazide Bis-(4,6-diamino 5-propyl pyrimidyl-2) thiocarbazide Bis-(2,6-diamino 5-phenyl pyrimidyl-4) thiocarbazide Bis-[4,6-di-(isobutylamino) pyrimidyl-2] carbazide
Bis-[4,6-di-(propenylamino) pyrimidyl-2] carbazide
Bis-[4,6-di-(cyclopentylamino) 5-propyl pyrimidyl-2] carbazide
Bis-(4,6-dianilino pyrimidyl-2) carbazide
Bis-(4,6-dianilino 5-phenyl pyrimidyl-2) thiocarbazide
Bis-(4,6-ditoluido pyrimidyl-2) carbazide
Bis-(4,6-ditoluido 5-chloroethyl pyrimidyl-2) carbazide
Bis-(4-methylamino 6-amino pyrimidyl-2) carbazide
Bis-(4-anilino 6-amino pyrimidyl-2) carbazide
Bis-(4-methylamino 6-anilino pyrimidyl-2) carbazide
Bis-(4-methylamino 5-fluorophenyl 6-ethylamino pyrimidyl-2) carbazide
Bis-(2-methylamino 6-bromoanilino pyrimidyl-4) thiocarbazide
Bis-[2,6-di-(benzylamino) pyrimidyl-4] carbazide
Bis-[2,6-di-(phenethylamino) pyrimidyl-4] carbazide
Bis-[2,6 - di - (ethylphenylamino) pyrimidyl-4] carbazide
Bis-[2,6-di-(naphthylamino) pyrimidyl-4] carbazide
Bis-[4,6-di-(iodoxylidino pyrimidyl-2] carbazide
Bis-(4,6-diamino 5-bromoethyl pyrimidyl-2) carbazide
Bis-(4-methylamino 5-bromophenyl 6-anilino pyrimidyl-2) thiocarbazide
Bis-(2,6-dianilino pyrimidyl-4) carbazide
Bis-(4,6-dianilino pyrimidyl-2) thiocarbazide
Bis-(2,6-dianilino pyrimidyl-4) thiocarbazide
Bis-(2,6-ditoluido pyrimidyl-4) carbazide
Bis-[4,6-di-(chloroanilino) pyrimidyl-2] carbazide
Bis-[2,6-di-(bromoanilino) pyrimidyl-4] thiocarbazide
Bis-[4,6-di-(iodotoluido) pyrimidyl-2] carbazide
Bis-[2,6-di-(fluoroanilino) pyrimidyl-4] thiocarbazide
Bis-(4,6-dixylidino pyrimidyl-2) carbazide
Bis-(2,6-dixylidino pyrimidyl-4) thiocarbazide
Bis-[4,6-di-(cyclohexylamino) 5-phenyl pyrimidyl-2] carbazide
Bis-[2,6-di-(octylamino) 5-ethyl pyrimidyl-4] thiocarbazide
Bis-[4,6-di-(allylamino) 5-allyl pyrimidyl-2] carbazide
Bis-[2,6-di-(cyclohexenylamino) pyrimidyl - 4] carbazide
Bis-[4,6-di-(methallylamino) 5-xenyl pyrimidyl-2] carbazide
Bis-(4,6-diamino 5-cyclohexyl pyrimidyl-2) thiocarbazide
Bis-(2,6-diamino 5-methyl pyrimidyl-4) carbazide The present invention is based on our discovery that new and valuable materials having particular utility in the plastics and coating arts can be produced by effecting reaction between ingredients comprising essentially an aldehyde, including polymeric aldehydes, hydroxyaldehydes and aldehyde-addition products, and a diazine derivative (a bis-diazinyl carbazide) of the kind embraced by Formula I, numerous examples of which have been given above and in our copending application Serial No. 455,214. Due to the numerous reactive positions in the diazine derivatives employed in practicing our invention, cured resinous aldehyde-reaction products prepared therefrom are outstanding in their resistance to water and organic solvents. The gloss and general appearance of molded articles made from molding compounds containing these new resins in heat-convertible state are exceptionally good. Other improved properties, including improved plasticity combined with rapid-curing characteristics and, also, high resistance to heat and abrasion in the cured state, make the products of the present invention suitable for use in fields of utility, for instance in electrically insulating applications, for which resinous materials of lesser resistance to heat, water, abrasion and organic solvents would be wholly unsuited.

It has been suggested heretofore that resinous materials be prepared by condensing an aliphatic aldehyde containing a chain of at the most four carbon atoms with compounds of the general formula III 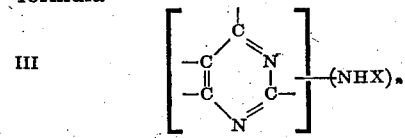

wherein $n$ is at least 2, X stands for a member of the group consisting of hydrogen and —NH$_2$, and wherein to the carbon atoms are attached hydrogen or radicals of the group consisting of the aforesaid —NHX groups, alkyl, phenyl, phenylene, hydroxy, alkoxy, mercapto, thioether and substituted amino groups. However, to the best of our knowledge and belief it was not known prior to our invention to prepare condensation products of aldehydes with diazine derivatives of the kind embraced by Formula I, which diazine derivatives are believed to be new chemical compounds. Our new condensation products have combined therein the desirable properties, e. g., excellent heat- and water-resistance, of the conventional aminodiazine-aldehyde resins and the desirable properties of the semicarbazide-aldehyde (or thiosemicarbazide-aldehyde) resins without sacrifice of other useful properties. This was quite surprising and unexpected and in no way could have been predicted.

In practicing our invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde - non - reactable nitrogen - containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the diazine derivative may be carried out in the presence or absence of solvents or diluents, other natural or synthetic resinous bodies, or while admixed with other materials that also can react with the aldehydic reactant, e. g., urea ($NH_2CONH_2$), thiourea, selenourea, iminourea (guanidine), substituted ureas, thioureas, selenoureas and iminoureas, e. g., aldehyde-reactable urea derivatives such as mentioned in D'Alelio Patent No. 2,285,418, issued June 9, 1942, page 1, column 1, lines 40-49; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aminotriazines, e. g., melamine, ammeline, ammelide, melem, melam, melon, numerous other examples being given in various copending applications of one or both of us, for instance in D'Alelio copending application Serial No. 377,524, filed February 5, 1941, and in applications referred to in said copending application; phenol and substituted phenols, e. g., the cresols, the xylenols, the tertiary alkyl phenols and other phenols such as mentioned, for example, in D'Alelio Patent No. 2,239,441, issued April 22, 1941; monohydric and polyhydric alcohols, e. g., butyl alcohol, amyl alcohol, heptyl alcohol, octyl alcohol, 2-ethylbutyl alcohol, ethylene glycol, propylene glycol, glycerine, polyvinyl alcohol, etc.; amines, including aromatic amines, e. g., aniline, etc.; and the like.

The modifying reactants may be incorporated with the diazine derivative and the aldehyde to form an intercondensation product by mixing all the reactants and effecting condensation therebetween or by various permutations of reactants as described, for example, in D'Alelio Patent No. 2,281,559, issued May 5, 1942 (page 2, column 1, lines 49-69), with particular reference to reactions involving a non-haloacylated urea, a halogenated acylated urea and an aliphatic aldehyde. For instance, we may form a partial condensation product of ingredients comprising (1) urea or melamine or urea and melamine, (2) a diazine derivative of the kind embraced by Formula I, for example bis-(4,6-diamino pyrimidyl-2) carbazide, bis-(2,6-diamino pyrimidyl-4) carbazide, a bis-(diamino pyrimidyl) thiocarbazide, a bis-[di-(methylamino) pyramidyl] carbazide, etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, e. g., hexamethylol melamine, etc. Thereafter we may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products may be used directly as casting resins; while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

*Example 1*

| | Parts |
|---|---|
| Bis-[2,6-di-(methylamino) pyrimidyl-4] carbazide | 36.2 |
| Aqueous formaldehyde (approx. 37.1% HCHO) | 32.4 | were heated together under reflux at the boiling temperature of the mass for 3 minutes. When a sample of the resulting resinous syrup was heated on a 140° C. hot plate, it cured to an insoluble and infusible state in the absence of a curing agent.

Instead of effecting reaction between the stated components under reflux as above described, the reaction may be carried out at a lower temperature, e. g., at room temperature, using a longer reaction period, e. g., from 6 to 24 hours or longer.

The resinous composition of this example may be used in the preparation of molding compositions.

*Example 2*

| | Parts |
|---|---|
| Bis-[2,6-di-(methylamino) pyrimidyl-4] carbazide | 36.2 |
| Aqueous formaldehyde (approx. 37.1% HCHO) | 32.4 |
| Sodium hydroxide in 1.5 parts water | 0.03 |
| Chloroacetamide (monochloroacetamide) | 0.3 |

All of the above ingredients with the exception of the chloroacetamide were heated together under reflux at the boiling temperature of the mass for 15 minutes. The chloroacetamide was now added and heating under reflux was continued for an additional 5 minutes. The resulting resinous syrup had a pH of 6.6. A molding composition was made from this syrup by mixing therewith 19.5 parts alpha cellulose in flock form and 0.2 part of a mold lubricant, specifically zinc stearate. When a sample of the dried molding compound was heated on a 140° C. hot plate, it cured rapidly to an insoluble and infusible mass. This indicated that the molding compound would be entirely satisfactory for the preparation of molded articles.

Example 3

| | Parts |
|---|---|
| Bis-[2,6-di-(methylamino) pyrimidyl-4] carbazide | 10.8 |
| Urea | 7.2 |
| Aqueous formaldehyde (approx. 37.1% HCHO) | 48.6 |
| Sodium hydroxide in 1.5 parts water | 0.03 |
| Aqueous ammonia (approx. 28% NH₃) | 1.8 |
| Chloroacetamide | 0.3 |

All of the above ingredients with the exception of the chloroacetamide were heated together under reflux at boiling temperature for 10 minutes, after which the chloroacetamide was added and refluxing was continued for an additional 4 minutes. The resulting resinous syrup had a pH of 5.9. A molding compound was prepared by mixing this syrup with 18.9 parts alpha cellulose and 0.2 part zinc stearate. The resulting composition was dried at room temperature until sufficient moisture had been removed to provide a material that could be molded satisfactorily. A well-cured molded piece was obtained by molding a sample of the dried and ground molding compound for 3 minutes at 135° C. under a pressure of 2,000 pounds per square inch. The molded article had very good resistance to water as shown by the fact that it absorbed only 2.7% by weight of water when immersed in boiling water for 15 minutes, followed by immersion in cold water for 5 minutes. The molding compound showed very good plastic flow during molding.

Instead of using chloroacetamide in accelerating the curing of the potentially reactive resinous material as described under Examples 2 and 3, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, ethylene diamine hydrochloride, aminoacetamide hydrochloride, the ethanolamine hydrochlorides, nitrourea, chloroacetyl urea, chloroacetone, glycine, sulfamic acid, citric diamide, phenacyl chloride, etc.). Other examples of curing reactants that may be employed to accelerate or to effect the curing of the thermosetting or potentially thermosetting resins of this and other examples are given in various copending applications of one or both of us, for instance in D'Alelio copending applications Serial No. 346,962, filed July 23, 1940, and Serial No. 354,395, filed August 27, 1940, both of which applications are assigned to the same assignee as the present invention.

Example 4

| | Parts |
|---|---|
| Bis-[2,6-di-(methylamino) pyrimidyl-4] carbazide | 27.4 |
| Para-amino benzene sulfonamide | 12.9 |
| Aqueous formaldehyde (approx. 37.1% HCHO) | 48.6 | were heated together under reflux at the boiling temperature of the mass for a few minutes, yielding a resinous syrup that cured to an insoluble and infusible state when a sample of it was heated on a 140° C. hot plate. The cured resin was quite resistant to attack by strongly alkaline reagents.

Example 5

| | Parts |
|---|---|
| Bis-[2,6-di-(methylamino) pyrimidyl-4] carbazide | 36.2 |
| Dimethylol urea (commercial grade containing approx. 11% by weight of water) | 53.5 |
| Sodium hydroxide in 2.5 parts water | 0.05 |
| Chloroacetamide | 0.5 |
| Water | 100.0 |

All of the above ingredients with the exception of the chloroacetamide were heated together under reflux at the boiling temperature of the mass for 12 minutes. The chloroacetamide was now added and heating under reflux was continued for an additional 5 minutes. The resulting resinous syrup had a pH of 7.6. A molding compound was prepared by mixing this syrup with 29.9 parts alpha cellulose and 0.2 part zinc stearate. The wet molding composition was dried as described under Example 3. A sample of the dried and ground molding compound was molded for 3 minutes at 135° C. under a pressure of 2,000 pounds per square inch. The molded piece was well cured and had excellent cohesive characteristics. The molded article had very good resistance to water as shown by the fact that it absorbed only 1.6% by weight of water when tested for its water resistance as described under Example 3. The molding compound showed excellent plastic flow during molding.

Example 6

| | Parts |
|---|---|
| Bis-[2,6 - di - (methylamino) pyrimidyl-4] carbazide | 36.2 |
| Acrolein | 22.4 |
| Aqueous ammonia (approx. 28% NH₃) | 3.6 |
| Sodium hydroxide in 1.5 parts water | 0.03 |
| Water | 20.0 | were mixed together, the acrolein being added last. An immediate exothermic reaction took place, resulting in the precipitation of a resinous mass from the solution. When a sample of this resin was heated on a 140° C. hot plate, it cured to an infusible material in the absence of a curing agent. The product of this example may be used in the preparation of molding compounds.

Example 7

| | Parts |
|---|---|
| Bis-[2,6 - di - (methylamino) pyrimidyl-4] carbazide | 36.2 |
| Butyl alcohol | 37.0 |
| Aqueous formaldehyde (approx. 37.1% HCHO) | 32.4 |
| Sodium hydroxide in 2 parts water | 0.04 | were heated together under reflux at the boiling temperature of the mass for 15 minutes. The resulting resinous syrup was dehydrated by heating it on a steam plate. The dehydrated syrup was soluble in water, ethyl alcohol, benzene and ethylene glycol. The syrupy condensation product was potentially heat-curable as evidenced by the fact that when chloroacetamide, sulfamic acid, citric acid or other curing agent such as mentioned under Example 3 was incorporated either into the syrup or into the dehydrated resin, followed by heating on a 140° C. hot plate, an insoluble and infusible resin was obtained. The solubility and film-forming characteristics of the resinous material of this example make it particularly suitable for use in the preparation of liquid coating compositions.

*Example 8*

| | Parts |
|---|---|
| Bis-[2,6 - di - (methylamino) pyrimidyl-4] carbazide | 36.2 |
| Acetamide | 5.9 |
| Aqueous formaldehyde (approx. 37.1% HCHO) | 32.4 |
| Sodium hydroxide in 2 parts water | 0.04 | were heated together under reflux at boiling temperature for 15 minutes. The resulting syrupy condensation product was potentially heat-curable as shown by the fact that when chloroacetamide, sulfamic acid, phthalic acid or other curing agent such as mentioned under Example 1 was added to the syrup, followed by heating on a 140° C. hot plate, the resinous material was converted to a cured or insoluble and infusible state.

*Example 9*

| | Parts |
|---|---|
| Bis-[2,6 - di - (methylamino) pyrimidyl-4] carbazide | 36.2 |
| Diethyl malonate | 16.0 |
| Aqueous formaldehyde (approx. 37.1% HCHO) | 32.4 |
| Sodium hydroxide in 1.5 parts water | 0.03 | were heated together under reflux at the boiling temperature of the mass for 7 minutes, at the end of which period of time a resin precipitated from the solution. When a sample of this resin was heated on a 140° C. hot plate, it cured to an infusible state in the absence of a curing agent. The resinous composition of this example may be used in the preparation of molding compounds.

*Example 10*

| | Parts |
|---|---|
| Bis-[2,6 - di - (methylamino) pyrimidyl-4] carbazide | 36.2 |
| Glycerine | 9.2 |
| Aqueous formaldehyde (approx. 37.1% HCHO) | 32.4 |
| Sodium hydroxide in 1.5 parts water | 0.03 | were heated together under reflux at boiling temperature for 23 minutes. The resulting resinous syrup was dehydrated by heating it on a steam plate. The dehydrated syrup was soluble in water, ethyl alcohol and ethylene glycol. Such solutions would be suitable for use as coating and impregnating compositions. The curing characteristics of the resinous material of this example were much the same as those of the resin of Example 8.

*Example 11*

| | Parts |
|---|---|
| Bis-[2,6 - di - (methylamino) pyrimidyl-4] carbazide | 36.2 |
| Polyvinyl alcohol | 4.4 |
| Aqueous formaldehyde (approx. 37.1% HCHO) | 32.4 |
| Sodium hydroxide in 1.5 parts water | 0.03 | were heated together under reflux at the boiling temperature of the mass for 23 minutes. The resulting resinous syrup cured to an insoluble and infusible state when treated with a small amount of hydrochloric acid, sulfamic acid or other curing agent such as mentioned under Example 3, followed by heating on a 140° C. hot plate. The unmodified syrup yielded a thermoplastic, transparent and exceptionally hard film when a sample of the syrup was applied to a glass plate, followed by baking the coated plate for several hours at an elevated temperature. The syrup to which a small amount of hydrochloric acid as a curing agent had been added also yielded hard, transparent films when applied to glass plates and baked at an elevated temperature for several hours. The resinous material of this example may be employed in the preparation of various liquid coating and impregnating compositions or it may be used in the production of molding compounds.

It will be understood, of course, by those skilled in the art that the reaction between the aldehyde and the diazine derivative may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of the foregoing examples under reflux at the boiling temperature of the mass as mentioned in the individual examples, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood by those skilled in the art that our invention is not limited to condensation products obtained by reaction of ingredients comprising an aldehyde and the specific diazine derivative embraced by Formula I that is named in the above illustrative examples. Thus, instead of bis-[2,6-di-(methylamino) pyrimidyl-4] carbazide, we may use, for example, bis-[4,6-di-(methylamino) pyrimidyl-2] carbazide, a bis-(diamino pyrimidyl) carbazide or thiocarbazide, or any other diazine derivative of the kind embraced by Formula I, numerous examples of which have been given above.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, heptaldehyde octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives of urea, thiourea, selenourea and iminourea, and of substituted ureas, thioureas, selenoureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazines, of the aminotriazoles, etc. Particularly good results are obtained with active methylene-containing bodies such as a methylol urea, more particularly mono- and di-methylol ureas, and a methylol aminotriazine, e. g., monomethylol melamine and polymethylol melamines (di-, tri-, tetra-, penta- and hexi-methylol melamines). Mixtures of aldehydes and aldehyde-addition products may be used, e. g., mixtures of formaldehyde and methylol compounds such, for instance, as dimethylol urea, trimethylol melamine, hexamethylol melamine, etc.

The ratio of the aldehydic reactant to the diazine derivative may be varied over a wide range depending upon the particular starting reactants employed and the particular properties desired in the finished product. Ordinarily these reactants are employed in an amount corresponding to at least one mol of the aldehyde, specifically formaldehyde, for each mol of the diazine derivative. Thus, we may use, for example, from 1 to 15 or 20 or more mols of an aldehyde for each mol of the diazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 35 or 40 or more mols of such alkylol derivatives for each mol of the diazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for example, methyl, ethyl, propyl, isopropyl, isobutyl, hexyl, etc., alcohols; polyhydric alcohols such, for example, as diethylene glycol, triethylene glycol, pentaerythritol, etc.; alcohol-ethers, e. g., ethylene glycol monomethyl ether, diethylene glycol monoethyl ether, ethylene glycol monoethyl ether, ethylene glycol monobutyl ether, diethylene glycol monomethyl ether, diethylene glycol monobutyl ether, etc.; amides, e. g., formamide, stearamide, acrylamide, benzene sulfonamides, toluene sulfonamides, adipic diamide, phthalamide, etc.; amines, e. g., ethylene diamine, phenylene diamine, etc.; ketones, including halogenated ketones; nitriles, including halogenated nitriles, e. g., succinonitrile, acrylonitrile, chloroacetonitriles, etc.; acylated ureas, including halogenated acylated ureas of the kind described, for example, in D'Alelio Patent No. 2,281,559, issued May 5, 1942; and others.

The modifying bodies also may take the form of high molecular weight bodies with or without resinous characteristics, for example hydrolyzed wood products, formalized cellulose derivatives, lignin, protein-aldehyde condensation products, aminotriazine-aldehyde condensation products (e. g., melamine-formaldehyde condensation products), aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a diazine derivative of the kind embraced by Formula I and an aldehyde, specifically formaldehyde, we may cause an aldehyde to condense with a salt (organic or inorganic) of the diazine derivative or with a mixture of the diazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, oxalic, polyacrylic, methacrylic, polymethacrylic, malonic, succinic, adipic, maleic, malic, fumaric, benzoic, salicylic, phthalic, camphoric, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The unmodified and modified resinous compositions of this invention have a wide variety of uses. For example, in addition to their use in in the production of molding compositions, they may be employed as modifiers of other natural and synthetic resins, as laminating varnishes in the production of laminated articles wherein sheet materials, e. g., paper, cloth, sheet asbestos, plywood, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the product of reaction of ingredients comprising an aldehyde and a compound corresponding to the general formula

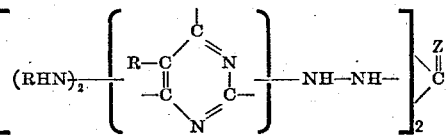

where R represents a member of the class consisting of hydrogen and monovalent hydrocarbon and halo-hydrocarbon radicals, and Z represents a member of the class consisting of oxygen and sulfur.

2. A composition of matter comprising the product of reaction of ingredients comprising formaldehyde and a compound corresponding to the general formula

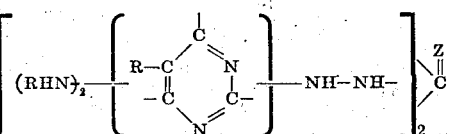

where R represents a member of the class consisting of hydrogen and monovalent hydrocarbon and halo-hydrocarbon radicals, and Z represents a member of the class consisting of oxygen and sulfur.

3. A composition of matter comprising the product of reaction of ingredients comprising an aldehyde and a compound corresponding to the general formula

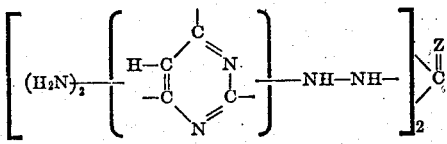

where Z represents a member of the class consisting of oxygen and sulfur.

4. A composition of matter comprising the product of reaction of ingredients comprising an aldehyde and a compound corresponding to the general formula

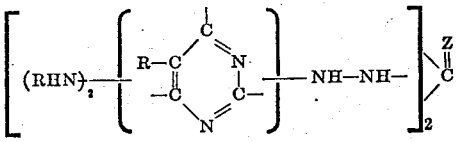

where Z represents oxygen, and R represents a member of the class consisting of hydrogen and monovalent hydrocarbon and halo-hydrocarbon radicals.

5. A composition of matter comprising the product of reaction of ingredients comprising an aldehyde and a compound corresponding to the general formula

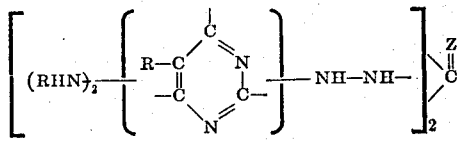

where Z represents sulfur, and R represents a member of the class consisting of hydrogen and monovalent hydrocarbon and halo-hydrocarbon radicals.

6. A composition as in claim 1 wherein the reaction product is the product obtained by effecting initial reaction between the components under alkaline conditions.

7. A composition as in claim 1 wherein the reaction product is an alcohol-modified reaction product of the stated components.

8. A heat-curable resinous composition comprising the heat-convertible condensation product of ingredients comprising formaldehyde and a compound corresponding to the general formula

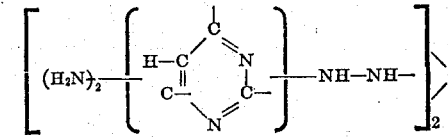

where Z represents a member of the class consisting of oxygen and sulfur.

9. A product comprising the cured resinous composition of claim 8.

10. A composition comprising the resinous condensation product of ingredients comprising an aldehyde and a bis-(diamino pyrimidyl) carbazide.

11. A resinous composition comprising the product of reaction of ingredients comprising formaldehyde and a bis-(diamino pyrimidyl) carbazide.

12. A composition comprising the resinous condensation product of ingredients comprising an aldehyde and a bis-(diamino pyrimidyl) thiocarbazide.

13. A composition comprising the resinous condensation product of ingredients comprising an aldehyde and bis-[2,6-di-(methylamino) pyrimidyl-4] carbazide.

14. A composition comprising the product of reaction of ingredients comprising a urea, an aldehyde and a compound corresponding to the general formula

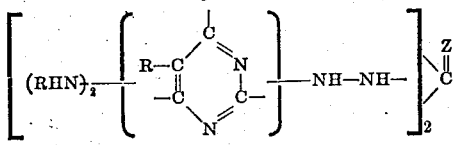

where R represents a member of the class consisting of hydrogen and monovalent hydrocarbon and halo-hydrocarbon radicals, and Z represents a member of the class consisting of oxygen and sulfur.

15. A composition comprising the product of reaction of ingredients comprising urea, formaldehyde and a compound corresponding to the general formula

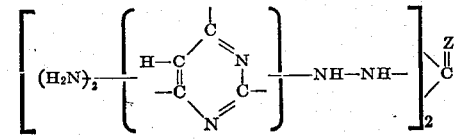

where Z represents a member of the class consisting of oxygen and sulfur.

16. A composition comprising the resinous product of reaction of ingredients comprising urea, formaldehyde and a bis-(diamino pyrimidyl) carbazide.

17. A resinous composition comprising the product of reaction of ingredients comprising dimethylol urea and a bis-(diamino pyrimidyl) carbazide.

18. A composition comprising the product of reaction of ingredients comprising an aminotriazine, an aldehyde and a compound corresponding to the general formula

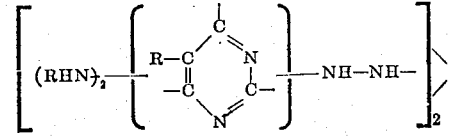

where R represents a member of the class consisting of hydrogen and monovalent hydrocarbon and halo-hydrocarbon radicals, and Z represents a member of the class consisting of oxygen and sulfur.

19. A heat-curable composition comprising the heat-convertible resinous reaction product of (1) a partial condensation product of ingredients comprising formaldehyde and a compound corresponding to the general formula

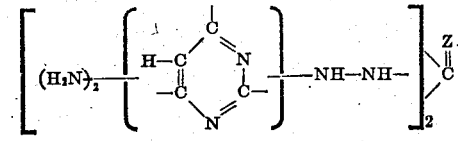

where Z represents a member of the class consisting of oxygen and sulfur, and (2) a curing reactant.

20. The method of preparing new synthetic compositions which comprises effecting reaction between ingredients comprising an aldehyde and a compound corresponding to the general formula
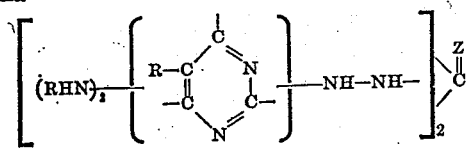
where R represents a member of the class consisting of hydrogen and monovalent hydrocarbon and halo-hydrocarbon radicals, and Z represents a member of the class consisting of oxygen and sulfur.
GAETANO F. D'ALELIO.
JAMES W. UNDERWOOD.

Certificate of Correction

Patent No. 2,328,962. September 7, 1943.

GAETANO F. D'ALELIO, ET AL.

It is hereby certified that errors appear in the printed specification of the above numbered patent requiring correction as follows: Page 1, first column, line 44, for "dephenyl" read *diphenyl*; line 60, after "iodophenyl" insert a comma; and second column, line 3–9, for that portion of the formula reading

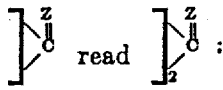

line 48, before "methylamino" insert an opening parenthesis; line 53, for "thiacarbazide" read *thiocarbazide*; page 2, first column, line 29, after "iodoxylidino" insert a closing parenthesis; page 3, first column, line 30, after "phthalic" strike out the comma; line 68, for "pyramidyl" read *pyrimidyl*; page 6, first column, line 7, for "hexi-methylol" read *hexa-methylol*; line 35, for "introducting" read *introducing*; page 7, first column, line 57–62, claim 8, for that portion of the formula reading

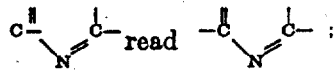

and that the said Letters Patent should be read with these corrections therein that the same may conform to the record of the case in the Patent Office.

Signed and sealed this 2nd day of November, A. D. 1943.

[SEAL]

HENRY VAN ARSDALE,
*Acting Commissioner of Patents.*